May 10, 1938.  J. BELLIS  2,116,556

VALVE

Filed Sept. 25, 1933

INVENTOR
Joseph Bellis

BY

ATTORNEYS

Patented May 10, 1938

2,116,556

UNITED STATES PATENT OFFICE 2,116,556

VALVE

Joseph Bellis, St. Paul, Minn.

Application September 25, 1933, Serial No. 690,876

7 Claims. (Cl. 251—75)

The present invention relates to a valve, and more particularly to a valve connected on opposite sides thereof to fluid pressures of different degrees.

In operating carburetor control mechanisms, such, for instance, as shown in my co-pending application, Serial Number 672,151, (Patent No. 2,066,667, dated Jan. 5, 1937,) and other mechanisms of such type, it is desirable to have a valve which will actuate the mechanism by movements of the operating pedals of the car upon which the device is mounted.

An object of the present invention is to make an improved valve to control fluid pressures on opposite sides thereof.

In order to attain this object, there is provided, in accordance with one construction of the invention, a casing having a reduced pressure or suction line opening into one side thereof, and a second line, also opening into said casing, and connected to a suction operated mechanism. A floating piston is mounted in the cylinder and is controlled by springs and the movement of a plunger mounted within the floating piston. The plunger is connected to an actuating member by means of which the valve action is controlled.

These and other features of the invention will be more fully brought out in the following description and the accompanying drawing, wherein.

Figures 1, 2, 3, 4, 5, 6:
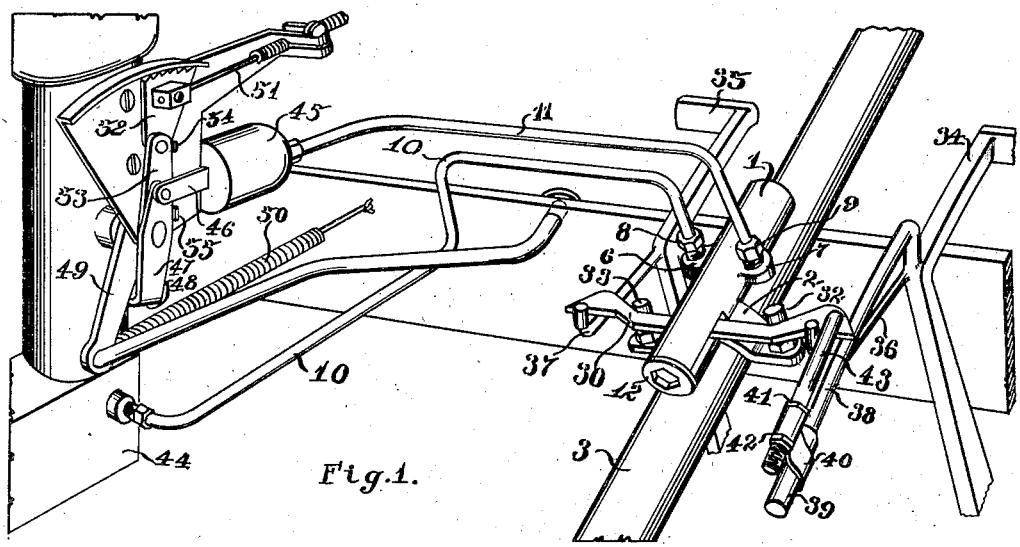
Figure 1 is a view in perspective of a valve embodying the present invention mounted in an automobile and connected to a carburetor control mechanism.
Figure 2 is a longitudinal, transverse, sectional view through the valve shown in Figure 1, with the valve in partially operated position.
Figure 3 is a sectional view similar to Figure 2 showing the valve in fully operated position.
Figure 4 is a sectional view similar to Figure 2 showing another phase of operation thereof.
Figure 5 is a sectional view similar to Figure 2 showing the valve in a normal operating position.
Figure 6 is a view in perspective of an inner valve piston.

Referring to the drawing in detail, a cylinder 1 is here shown as having a mounting bracket 2 mounted on an automobile steering column 3. The cylinder 1 has a closed end 4 with a post 5 extending longitudinally into the cylinder. The cylinder 1 is formed with ports 6 and 7 on opposite sides thereof, each of which is provided with a threaded opening communicating therewith to receive compression fittings 8 and 9, respectively, to connect tubes 10 and 11 to the cylinder 1.

Slotted, longitudinally disposed openings 18 and 19 are provided in opposite sides of the cylinder 1 near the base thereof, said base being interiorly threaded to receive a closure cap 12. The side of the cylinder adjacent the port 6 is recessed as at 13 and a second recess 14 is provided in open communication with the port 7, said recess extending upwardly along the side of the cylinder wall to a point above the bottom of the post 5. A floating cylinder 15 is slidably mounted in the cylinder 1, the floating cylinder 15 having notches 16 and 17 in opposite sides thereof adjacent the base to register with the slotted openings 18 and 19 when the piston 15 is mounted in the cylinder 1. The piston 15 has two ports 20 and 21 on opposite sides thereof, these ports being vertically offset, as shown in the sectional views in Figures 2, 3, 4, and 5.

A hollow plunger 22 is slidably mounted within the floating piston 15. This plunger 22 has an axially disposed opening 23 extending the entire length thereof. Notches 24 and 25 are provided in opposite sides of the lower end of this plunger to register with the notches in the cylinder 1 and the notches in the floating piston 15 and slotted openings in the cylinder 1. A portion 26 of the plunger 22 is of reduced diameter for a purpose to be brought out later in the specification. The head portion 29 of the plunger, being of a length greater than the diameter of the port 21 and the reduced portion 26, is of a length to be opposite the port 20 in all operative positions of the valve.

A coil spring 27 is mounted between the top of the plunger 22 and the head of the floating piston 15 to normally hold the top of the plunger 22 below the top of the port 21, as shown in Figure 3 of the drawing. A second coil spring 28, materially stronger than the coil spring 27 is mounted between the top of the floating piston 15 and the inner top surface of the cylinder 1.

The respective lengths of the cylinder 1, floating piston 15, the plunger 22 are best shown in Figure 3 of the drawing, wherein both the floating piston and the plunger are in fully lowered position with the lower ends thereof resting against the grip nut 12. It will be noted that in this fully lowered position the port 20 is in communication with the space surrounding the reduced portion 26 of the plunger 22 and that the top of the plunger is below the upper edge of the port 21.

A transverse rocking beam 30 is mounted on a pivot pin 31 in the plunger 22 to permit free rocking action of the beam 30. Stop studs 32 and 33 are mounted on the bracket 2 to limit the upward movement of the beam 30.

A clutch pedal 34 and brake pedal 35 of a conventional type are provided with extensions 36 and 37, respectively, which are bent upwardly at their lower ends to engage the beam 30 to normally hold it in a fully raised position to move the parts to the position shown in Figure 5. An extension 38 is also provided on the clutch pedal and is provided with an enlarged lower end portion 39 which is gripped by a spring clasp 40 adjustably mounted by means of nuts 41 and 42 on a link 43 mounted in an opening in the beam 30.

The tube 10 is connected to open into the intake manifold 44 and the tube 11 is connected to open into a cylinder 45 in which is mounted a plunger, not shown, connected to a connecting link 46. This link in turn is connected to a lever 47, which has a turned down end portion 48 to engage a throttle lever 49. A coil spring 50, normally holds the throttle lever 49 in closed position. A hand throttle control wire 51 is mounted in the instrument panel of an automobile, not shown, in the customary manner, and is connected to an arm 52 which is pivotally mounted on the end of a second arm 53 which is pivotally mounted on the same post as the arm 47.

The arm 52 has a lug 54 thereon adapted to engage the arm 53 on clockwise, rotative movement of the arm 52 which respect to the arm 53, as shown in Figure 1 of the drawing, to limit the rotative movement of the arm 52. The arm 53 has a lug 55 thereon which engages the arm 47 on the clockwise rotation of said arm 47 to limit the rotative movement of said arm 47. The clearance between the clutch and brake pedals and their relative operating mechanisms is such as to permit either the clutch or brake pedal to be moved down sufficiently to bring the parts into the position shown in Figure 3 before releasing the clutch, or with the beam 30 tilted in the opposite direction, engaging the brake. This clearance in actual practice will be about three-fourths of an inch to one inch, which is considered standard.

The operation of the device is as follows: Assuming that the automobile is running with brake and clutch pedals both in normal position, the car in gear, and the hand throttle adjusted for a speed of about forty miles an hour. This set of facts is assumed for the initial point of the operating description, since the parts shown in Figure 1 are approximately in the position they would occupy under these circumstances.

The clutch and brake pedals being both released by the operator the arms 36 and 37 engage the beam 30 to draw the beam into engagement with the stop studs 32 and 33. This moves the floating piston 15 and plunger 22 to the position shown in Figure 5, since the clutch and brake pedal springs are stronger than the spring 27. This forces the top of the floating piston against the post 5. The recess 13 is in open communication with the port 20 and thence with the recess around the reduced portion 26 of the plunger 22.

The head portion 29 of the plunger exposes part of the port 21 so that the reduced pressure from the tube 10 is transmitted through the port 20 around the space surrounding the reduced portion 26 of the plunger, through the port 21, up along the recess 14, to the head of the floating piston, which assists in maintaining the floating piston in fully raised position against the tension of the spring 28; thence the reduced pressure is transmitted to the tube 11 into the cylinder 45. The piston, not shown, in this cylinder, is forced inwardly by the reduced pressure on its inner face, the outer face of said piston being exposed to atmospheric pressure and the connecting link 46 draws the arm 47 in a clockwise movement against the stop 55, which limits its clockwise movement. The lower end of the arm 47 moves the throttle 49 to open, adjusted position, this adjustment being accomplished by the throttle wire 51. If it is desired to slightly decelerate the motor without completely shutting it off, either the clutch pedal 34 or the brake pedal 35 may be depressed slightly, thereby freeing the beam 30 for downward movement.

In Figure 4 the parts are shown with the beam in the position it would ocupy with the clutch pedal slightly depressed to bring the beam 30 down to the position illustrated in Figure 4. This moves the plunger 22 downwardly so that the head of the piston is drawn below the upper edge of the port 21. This opens the area of reduced pressure in the recess 14 and in the upper end of the cylinder 1 and in the tube 11 and the cylinder 45, rearwardly of the piston, not shown, mounted therein, to the atmosphere through the port 21, the interior of the floating piston 15 above the head of the plunger 22, and the opening 23 in the hollow plunger 22. The atmospheric pressure being transmitted to the head of the floating piston 15, the pressure of the spring 28 thereon thereupon forces the floating piston downwardly until the port 21 is again sealed by the plunger head 29 and in practice the port 21 has been found to go below the head 29 to the position shown in Figure 4.

The above action permits the reduced pressure to again be transmitted from the space surrounding the reduced portion 26 of the plunger through the port 21 to the head of the floating cylinder and the cylinder 45. When the reduction in pressure of the head of the floating piston is sufficient to again force it upwardly against the tension of the spring 38, the atmospheric air will again be admitted from the area above the top of the plunger through the port 21 and by this process being repeated the floating cylinder 15 will oscillate back and forth to maintain a slightly reduced pressure within the cylinder 45 so as to hold the carburetor valve partially open, but not open to the fully adjusted position it will occupy when the parts are in the position shown in Figure 5. As the tension on the spring 28 decreases the farther it extends it is apparent that when the plunger 22 is moved upwardly only slightly, that a relatively higher vacuum will be maintained in the tube 11 and cylinder 45 than will be the case when the plunger is pushed downwardly farther to the approximate position shown in Figure 4.

When either of the pedals 34 or 35 is depressed a distance sufficient to move the plunger 22 downwardly into engagement with the cap-nut 12, the plunger and the floating piston 15 will both be in engagement with the nut 12 and the top of the plunger will be below the top of the port 21, thereby holding the parts in position to permit air at atmospheric pressure to pass through the opening 23 in the plunger and the port 21 to the tube 11 and cylinder 45, thereby permitting the spring 50 to draw the carburetor valve 49 to a closed position.

The driver is thus given full control of the operating speed of the car with the hand throttle in adjusted position by means of the clutch and brake pedals of the car, without the necessity of using auxiliary throttle control means and without moving the clutch or brake pedals to the position which will operate either the clutch release or the brake engaging mechanism.

Various modifications of the device for application to an automobile having, for instance, an automatic clutch of a recent, but well known type, will be apparent to those skilled in the art and the present valve is clearly adapted to all similar uses by slight modification in structure which will be apparent to any skilled mechanic.

It is to be noted that the invention embodies the low pressure space 6, the high or atmospheric pressure space 23, and the controlled pressure space 7. The controlled pressure space 7 may have its pressure either that of the low pressure space 6 or the atmospheric pressure space 23, and said space 7 constitutes the controlling pressure side and is defined as such in the claims.

I claim:

1. A control member having a low pressure side and a controlled pressure side, a cylinder, a slidable element mounted therein and having a port therein in constant communication with said low pressure side, a second port in said slidable element offset from said first port, an operator controllable member slidably mounted in said slidable element and having a portion thereof movable with respect to said second port in said slidable element to expose said second port to said low pressure side or to atmospheric pressure, and spring means mounted to control the degree of pressure on the controlled pressure side.

2. A control member having a low pressure side and a controlled pressure side, comprising a casing, a slidable element mounted therein and having a port therein in constant communication with said low pressure side and having a second port offset from said first mentioned port communicating with said controlled pressure side, said slidable element having an area thereof at right angles to its direction of movement exposed to atmospheric pressure, and having a second area thereof at right angles to its direction of movement exposed to said controlled pressure side, a controllable valve element mounted adjacent said offset port, and movable with respect to said port to expose said port to said low pressure side or to atmospheric pressure, and spring means mounted to control the degree of pressure on the controlled pressure side.

3. A control mechanism having a low pressure side and a controlled pressure side, a floating piston element mounted therein and having a port exposed to said low pressure side, and having a second port offset from said first port and exposed to said controlled pressure side, a controllable member mounted in said piston and having a channel exposed to said low pressure port in said piston, and having a sealing element movable into sealing engagement with said offset port and movable to expose said offset port to atmospheric pressure or to said low pressure side, and spring means acting on said piston, to control through said piston the degree of pressure on the controlled pressure side.

4. A control mechanism operative below atmospheric pressure, having a low pressure side and a controlled pressure side, including a casing, a contained floating cylinder operated by the difference in pressure between the controlled pressure side and the low pressure side, spring means within the chamber of said casing opposing the movement of the floating cylinder when the controlled pressure in the spring means chamber is reduced to low pressure, a plunger operatively connected to an operator actuated part to control the plunger action, said plunger being coordinated with said floating cylinder to reduce the controlled pressure to a desired degree of low pressure causing the floating cylinder to move against the spring in reduction of pressure in spring chamber, and in the opposite direction by the increase of pressure in the spring chamber.

5. A control mechanism having a low pressure side and a controlled pressure side, including a casing, a floating cylinder element mounted therein having a port exposed to the low pressure side and having a second port normally exposed to said controlled pressure side, a controllable plunger mounted in said cylinder to seal said controlled pressure port, and movable to expose said controlled pressure port to atmospheric pressure or to said low pressure side, and spring means acting on said cylinder to control the position of said cylinder with respect to said plunger to control the degree of pressure on said controlled pressure side, and a stop element for said floating cylinder limiting the degree of collapse of said spring and allowing further movement of the plunger in the direction of the stop element, and stop means for said plunger opposed to said stop element and holding the control parts in position, permitting full communication between the controlled and low pressure sides.

6. A control mechanism having a low pressure side and a controlled pressure side, a floating piston element mounted therein and having a port exposed to said low pressure side, and having a second port normally exposed to said controlled pressure side, a controllable valve member mounted in said piston to seal said controlled pressure port, said valve member being operatively connected to an operator actuated part, and movable to expose said controlled pressure port to atmospheric pressure or to said low pressure side, and spring means controlling the degree of pressure on the controlled pressure side through said piston.

7. A control mechanism operative below atmospheric pressure, having a low pressure side and a controlled pressure side, ported means operated by a difference of pressure between said controlled pressure side and said low pressure side, spring means controlling the degree of pressure on said controlled pressure side through said ported means and opposing a movement of said ported means toward said low pressure side, and an operator actuable controllable valve element co-operating with said ported means and mounted to control the pressure on said controlled pressure side.

JOSEPH BELLIS.